United States Patent [19]
Kitagawa

[11] Patent Number: 5,999,746
[45] Date of Patent: Dec. 7, 1999

[54] CAMERA WITH AN AUTO-FOCUSING FUNCTION

[75] Inventor: Yoshihisa Kitagawa, Kasukabe, Japan

[73] Assignee: Nikon Corporation, Tokyo, Japan

[21] Appl. No.: 09/075,837

[22] Filed: May 12, 1998

[30] Foreign Application Priority Data

May 12, 1997 [JP] Japan .................................. 9-120417

[51] Int. Cl.$^6$ .................................................. G03B 17/00
[52] U.S. Cl. ............................................. 396/52; 396/89
[58] Field of Search ................. 396/52, 53, 54, 396/55, 89

[56] References Cited

U.S. PATENT DOCUMENTS

| | | | |
|---|---|---|---|
| 4,774,538 | 9/1988 | Kawai | 396/53 |
| 5,623,326 | 4/1997 | Okano | 396/55 |
| 5,678,067 | 10/1997 | Kitagawa et al. | 396/55 |
| 5,678,071 | 10/1997 | Ohtake | 396/55 |
| 5,771,407 | 6/1998 | Imafuji et al. | 396/55 |
| 5,847,874 | 12/1998 | Sasao etal. | 396/52 |
| 5,862,415 | 1/1999 | Matsumoto | 396/55 |

FOREIGN PATENT DOCUMENTS

4-18514   1/1992   Japan .
7-294975  11/1995  Japan .

Primary Examiner—Russell Adams

[57] ABSTRACT

An auto-focus camera for performing focusing adjustment of a focusing lens group to actualize an in-focus state, that includes an auto-focusing adjustment unit to move the focusing lens group along an optical axis based on a detection signal, and an in-focus state detection unit to detect the in-focus state and output a corresponding output signal. The auto-focusing adjustment unit performs the focus adjustment using the output signal of the in-focus state detection unit as the detection signal. The auto-focus camera also includes a displacement detection unit to detect displacement of the photographic optical system along the optical axis and to output a corresponding output signal. The auto-focusing adjustment unit switches the detection signal from the output signal of the in-focus state detection unit to the output signal of the displacement detection unit to enable continued focusing adjustment throughout the photographic operation, including during an exposure process.

23 Claims, 5 Drawing Sheets

CAMERA WITH AN AUTO-FOCUSING FUNCTION

CROSS-REFERENCE TO RELATED APPLICATIONS

This application is based upon and claims priority of Japanese Patent Application No. 09-120417, filed May 12, 1997, the contents being incorporated herein by reference.

BACKGROUND OF THE INVENTION

The present invention relates to a camera having an auto-focus function, and more particularly, the present invention relates to a camera having an auto-focus function that prevents out-of-focus images resulting from changes in object distance during an exposure process or operation.

An auto-focusing function of a camera automatically focuses a photographic subject to prevent a photographic image taken by a photographer from being out-of-focus, without requiring the photographer to have special training. Current cameras that include an auto-focusing function are equipped with an auto-focus ("AF") mirror provided in an AF drive of a focusing lens group, an AF sensor for detecting an in-focus state, and a photographic optical system. The AF mirror introduces a portion of the photographic light into the AF sensor which is typically a CCD element, for example. The AF sensor determines whether an in-focus state is achieved by detecting lateral displacement of the photographic image formed by the light from the AF mirror. The AF drive moves a focusing lens to a position that corresponds to the in-focus state based on an output signal from the AF sensor.

The above noted series of operations effected by the AF sensor for reaching an in-focus state are executed during a photographic preparation mode when the photographer partially presses a shutter release button. If the shutter release button is pressed to a fully pressed position after the in-focus state is achieved by the AF sensor, a photographic operation takes place. During the photographic operation, the AF mirror is raised to recede outside of the photographic optical system, enabling photographic light to reach a photographic plane. Subsequently, an exposure occurs while the shutter is opened for a specified period of time.

Since the AF mirror recedes outside of the photographic optical system, the in-focus state cannot be confirmed during the photographic operation. In addition, since the photographic light is not introduced to the AF sensor during an exposure process of the photographic operation, the in-focus state of the photographic optical system cannot be confirmed during the exposure process. As a result, during the photographic operation of prior art auto-focus cameras, the present in-focus state of the photographic optical system is maintained. Therefore, despite changes in the object distance that result when the camera moves during the exposure process no readjustment is made to the focal point.

When held by hand, the camera moves in various directions during the photographic operation. For example, during hand-held operation, the camera tends to move in both the pitching and yawing directions with respect to an optical axis of the camera. A hand-held camera also has a tendency to rotate in a rolling direction by rotating in the direction of the optical axis, or about the optical axis in a vertical or lateral direction. This rotation in the rolling direction results in parallel vibration, which tends to corrupt the in-focus state of the camera.

Snap shots account for a greater portion of photographic pictures that are taken. When taking a snap shot, camera shake tends to result in either a parallel or rolling direction. This parallel vibration generally does not affect the intended photographic image in terms of the object distance and the focal length, since the amount of movement of the subject that results on the image forming plane due to the parallel vibration is insignificant to compared to the amount of movement that occurs due to vibration in either the pitch or yaw direction. In addition, the effect of parallel vibration is also diminished since the effect of parallel vibration to the intended photographic image is diminutive compared with either the depth of the field, permissible shaking on the image forming plane, or the resolution of the human eye. Consequently, although compensation for the shaking of the photographic image in either the pitch or yaw direction is accomplished using a camera shake compensation mechanism, disclosed for example, in either of Japanese Laid-Open Patent Publication No. 4-18514 or No. 7-294975, no appropriate measures have been taken for out-of-focus images caused by other types of camera shakes.

For instance, in portrait photography, where the photographic range is expanded and the aperture is set to an almost open position to shoot the photographic subject in a close up view, minute changes in distance between a photographic subject and the camera have a significant effect on the photographic image. During close-up operation, the depth of the field is decreased, causing the image forming position to be out of the depth of field. As a result, a slight movement of the camera can cause an out-of-focus image. In this way, even if the focus has been set just prior to exposure, the intended photographic image may nonetheless be out-of-focus, since the object distance may momentarily change when the camera moves along the optical axis during a shutter release time lag, or during exposure.

A similar condition may also occur during close-up photography if the photographic image is taken by a camera that is held by hand rather than using a tripod. Since a photographic magnification level is particularly high in close-up photography, the depth of the field is small and becomes out-of-focus when there is a slight change in the object distance of the photographic subject, thereby considerably affecting the outcome of the resulting photograph.

As a result, the auto-focusing function of prior art cameras is not fully utilized since the auto-focusing function does not operate during the exposure process. As a result, prior art auto-focus cameras tend to produce out-of-focus photographic images when used for portrait or close-up photography.

BRIEF SUMMARY OF THE INVENTION

It is therefore an object of the present invention to provide a camera that includes an auto-focusing function with improved focusing accuracy.

It is a further object of the present invention to provide a camera that includes an auto-focusing function that prevents out-of-focus photographic images resulting from changes in object distance during an exposure process.

It is a further object of the present invention to provide a camera that includes an auto-focusing function that efficiently utilizes a power supply of the camera.

It is a still further object of the present invention to provide a camera that includes an auto-focusing function that confirms an in-focus state throughout a photographic operation.

It is yet another object of the present invention to provide a camera that includes an auto-focusing function that prevents out-of-focus photographic images when used for portrait or close-up photography.

Objects of the invention are achieved by an auto-focus camera that performs focusing adjustment of a focusing lens group to actualize an in-focus state. The camera includes an auto-focusing adjustment unit to move the focusing lens group along an optical axis based on a detection signal, and an in-focus state detection unit to detect the in-focus state and to output a corresponding output signal. The camera also includes a displacement detection unit to detect displacement of the camera along the optical axis and to output a corresponding output signal. The auto-focusing adjustment unit uses the output signal from the in-focus state detection unit as the detection signal and switches the detection signal from the output signal of the in-focus state detection unit to the output signal of the displacement detection unit.

Further objects of the invention are achieved by an auto-focus camera that performs focusing adjustment of a focusing lens group to actualize an in-focus state. The camera includes an auto-focusing adjustment unit to move the focusing lens group along an optical axis based on a detection signal, and an in-focus state detection unit to detect the in-focus state and to output a corresponding output signal. The camera also includes a displacement detection unit to detect displacement of the camera along the optical axis and to output a corresponding output signal, and a position detection unit to detect a position of the focusing lens group along the optical axis and to output a corresponding signal. The auto-focusing adjustment unit uses the output signal from the in-focus state detection unit as the detection signal and switches the detection signal to the output signal of the displacement detection unit. In addition, the auto-focusing adjustment unit determines the position of the focusing lens group from the output signal of the position detection unit, while using the output signal of the displacement detection unit as the detection signal.

Further objects of the invention are achieved by an auto-focus camera that performs focusing adjustment of a focusing lens group to actualize an in-focus state. The camera includes an in-focus state detection unit to detect the in-focus state and to output a corresponding in-focus state signal; a displacement detection unit to detect displacement of the camera along the optical axis and to output a corresponding displacement signal; an auto-focusing adjustment unit to move the focusing lens group along an optical axis using the in-focus state signal or the displacement signal; a first signal generation unit to output a first instruction signal to execute a photographic preparation operation, and a second signal generation unit to output a second instruction signal to execute a photographic operation after the first signal generation unit outputs the first instruction signal; an optical path forming unit to form an optical path that connects a photographic subject and the in-focus state detection unit using light that passes through the camera while a photographic operation is not being carried out; a photographic magnification calculation unit to obtain a photographic magnification level; a position detection unit to detect a position of the focusing lens group along the optical axis and outputs a corresponding signal; a camera shake detection unit to detect displacement along an image forming plane perpendicular to the optical axis; a camera shake compensation optical system to change the optical axis of the photographic optical system; and a camera shake compensation unit to compensate for camera shake in the plane direction of the image forming plane by driving the camera shake compensation optical system.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 1:
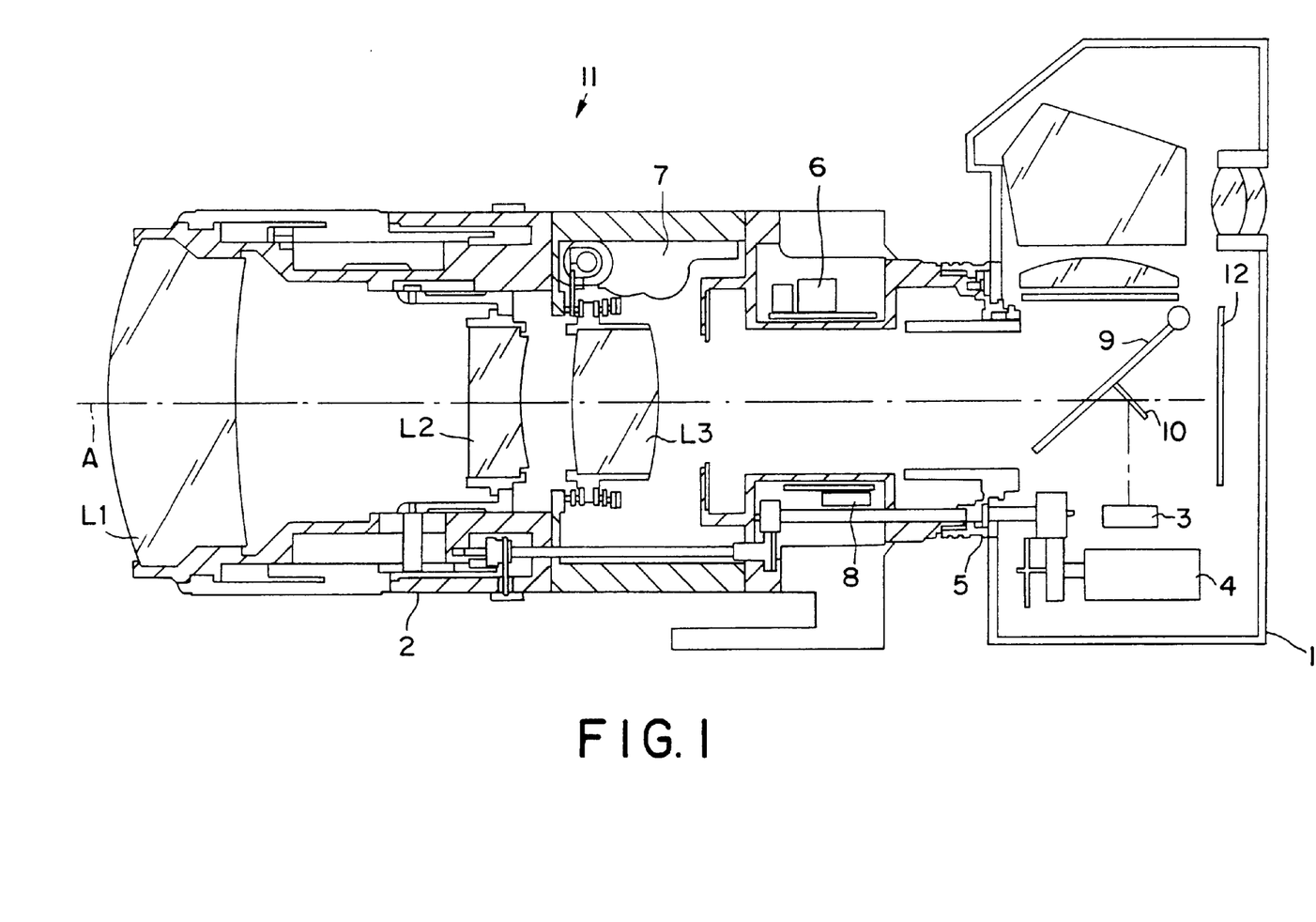
FIG. 1 is a cross-sectional view of a camera according to a preferred embodiment of the present invention.

FIG. 1 is a cross-sectional view of a camera 11 that includes an auto-focusing function according to a preferred embodiment of the present invention. As illustrated in FIG. 1, the auto-focus camera 11 includes a lens barrel 2 mounted on a camera body 1. Lens barrel 2 has three lens groups that form a photographic optical system, including a fixed lens group L1, a focusing lens group L2, and a vibration compensation or VR lens group L3. A photographic optical axis A of the photographic optical system corresponds to a line that extends from and is perpendicular to camera body 1 to a photographic subject (not shown) viewed through the photographic optical system. Fixed lens group L1 does not move in either a parallel or a perpendicular direction, relative to optical axis A. Focusing lens group L2 moves forward and backward along optical axis A to adjust an in-focus state of the photographic optical system. VR lens group L3 moves within a plane perpendicular to optical axis A and is used to compensate for camera shake or vibration.

A power source, such as a DC motor 4, is installed within camera body 1. DC motor 4 drives focusing lens group L2 to execute an auto-focus procedure. Rotational power generated by DC motor 4 is transferred to lens barrel 2 through a coupling 5. The transferred rotational power is reduced by a gear (not shown) within lens barrel 2, and is then transferred to focusing lens L2 by a helicoid (not shown) to drive focusing lens group L2 along optical axis A.

An auto-focus, or "AF" sensor 3, is installed within camera body 1. AF sensor 3 is a CCD imaging element, for example, that detects an in-focus state of the photographic optical system. A portion of an image of a photographic subject is guided to AF sensor 3 by a reflective mirror 10 positioned on a film plane side of a quick return mirror 9, to form two images on AF sensor 3. AF sensor 3 detects the distance and slippage, or defocus amount, between the two images.

Figure 2:
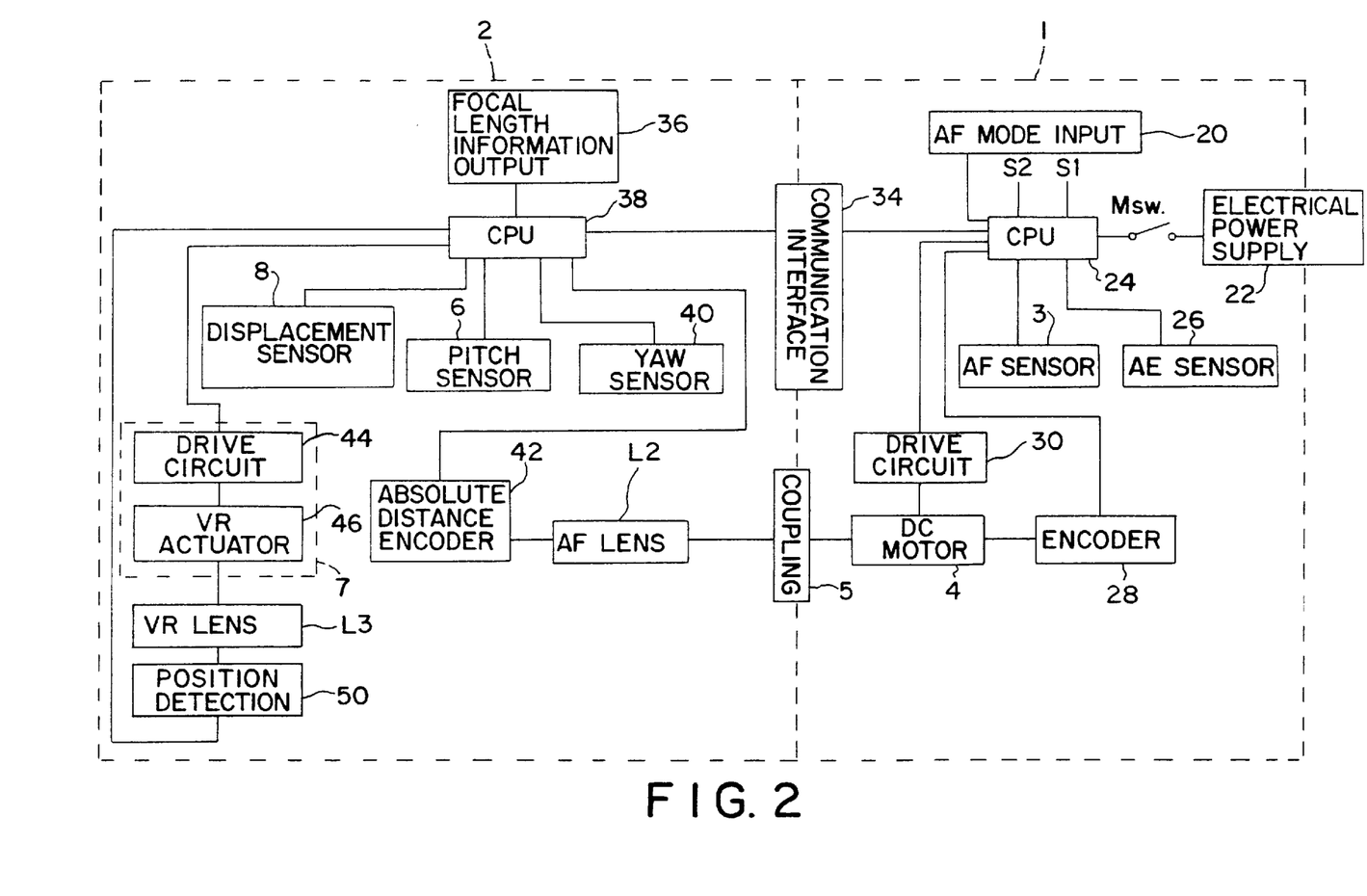
FIG. 2 is a block diagram of a camera according to a preferred embodiment of the present invention.

A pitch sensor 6 positioned in an upper section of lens barrel 2 detects vibration of camera 11 and focusing lens group L2 in a pitch direction with respect to optical axis A. As illustrated in FIG. 2, a yaw sensor 40 is provided in lens barrel 2. As illustrated in FIG. 1, yaw sensor 40 (not shown in FIG. 1) is located in an area at a 90 degree rotation, with respect to optical axis A, from the position at which pitch sensor 6 is positioned. Yaw sensor 40 detects the amount of vibration of camera 11 and focusing lens in a yaw direction.

A vibration compensation drive unit 7 drives VR lens group L3 to shift or to tilt VR lens group L3 to compensate for a blur effect, due to camera shake or vibration in the pitch or yaw direction, on an image of the photographic subject formed on an image forming plane 12.

A displacement sensor 8, which may be an acceleration sensor, a velocity sensor, or a position sensor, is used to detect displacement of camera 11 and focusing lens group L2 along optical axis A. For example, if displacement sensor 8 is an acceleration sensor, the displacement of camera 11 is detected by integrating an output signal of the acceleration sensor twice, using an integration circuit as is known in the art. On the other hand, if displacement sensor 8 is a velocity sensor, the displacement is detected by integrating only once.

FIG. 2 is a block diagram illustrating the configuration of camera 11 according to a preferred embodiment of the present invention. Camera body 1 is equipped with a CPU 24 that controls the operation of camera body 1. A main switch Msw is connected to CPU 24 and provides electrical power by forming a connection with an electrical power supply 22. In addition, two more switches S1 and S2 are connected to CPU 24. Switches S1 and S2 combine to form a shutter release button, with switch S1 being a half push switch and switch S2 being a full push switch.

Camera body 1 also includes an auto-exposure or "AE" sensor 26 that is used in an automatic exposure operation. Both AE sensor 26 and AF sensor 3 are connected to CPU 24. Both DC motor 4 and a drive circuit 30 for driving DC motor 4 are also connected to CPU 24. An encoder 28 measures a rotational angle of DC motor 4 and outputs a corresponding measurement value to CPU 24 for use in feedback control.

Similarly, lens barrel 2 is also equipped with a CPU 38 that controls the operation of lens barrel 2 while communicating with CPU 24 of camera body 1 through a communication interface unit 34. In addition to pitch sensor 6, yaw sensor 40, displacement sensor 8, and vibration compensation drive unit 7, an absolute distance encoder 42 and a focal length information output unit 36 are connected to CPU 38. Focal length information output unit 36 outputs information regarding the focal length that is actually attained by the photographic optical system. On the other hand, absolute distance encoder 42 is a sensor that detects a position of focusing lens group L2 along optical axis A.

Vibration compensation drive unit 7 includes a VR actuator 46 that drives VR lens group L3 and a drive circuit 44 that drives VR actuator 46. Moreover, VR actuator 46 includes a DC motor (not shown) that functions as a driving source, a gear (not shown) that reduces the rotational force generated from the DC motor, and a feed screw (not shown) that converts the rotational movement transmitted from the gear into a linear movement, thereby driving and shifting VR lens group L3. Vibration compensation drive unit 7 described herein is merely one of many examples that can be used for the vibration compensation mechanism. It is also possible to use other vibration compensation mechanisms as known in the art, such as that disclosed in, for example, Japanese Laid-Open Patent Publications No. 4-18514 or No. 7-294975.

Figure 3:
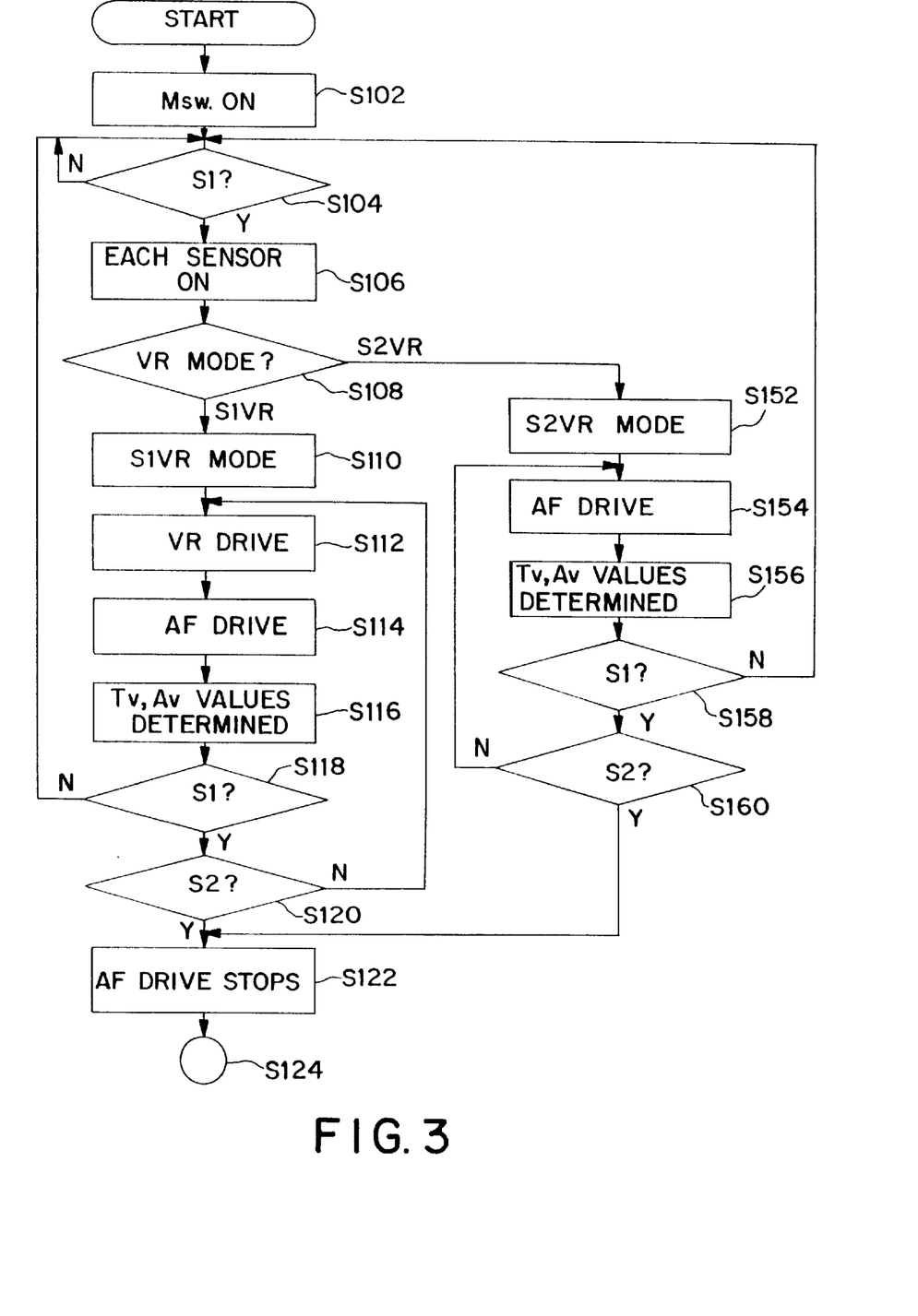
FIG. 3 is a flowchart of an operation of a camera according to a preferred embodiment of the present invention.
Figure 4:
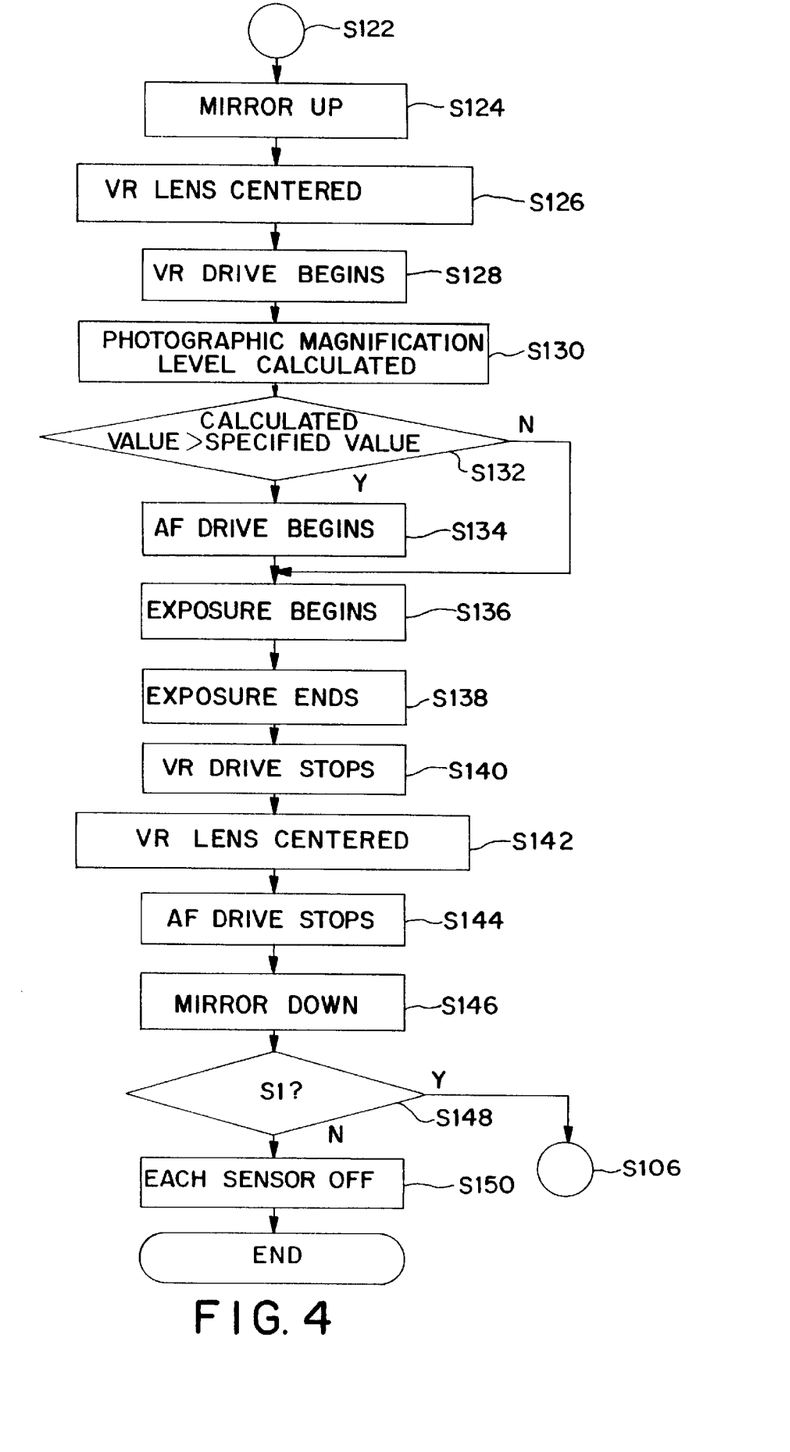
FIG. 4 is a flowchart of an operation of a camera according to a preferred embodiment of the present invention that is sequential to the flowchart of FIG. 3.

FIGS. 3 and 4 are flowcharts illustrating the operation of camera 11 according to a preferred embodiment of the present invention. As illustrated in FIG. 3, a determination is made in step S102 as to whether main switch Msw is turned ON. When main switch Msw is ON, a determination is made in step S104 as to whether switch S1, which initiates a 135 preparation of the photographic operation, is also turned ON. If switch S1 is turned ON, electric power is supplied to AF sensor 3 and AE sensor 26 of camera body 1 in step S106. Electric power is also supplied to pitch sensor 6, yawing sensor 40, and displacement sensor 8 of lens barrel 2.

Subsequently, the type of vibration compensation mode (hereinafter referred to as the "VR mode") is determined in S108. VR modes include a S1VR mode and a S2VR mode. In the S1VR mode, a vibration compensation procedure is initiated by activation of switch S1. In the S2VR mode, a vibration compensation procedure is initiated as switch S2 is turned ON, that is, a vibration compensation procedure is performed only during the exposure operation. If the VR mode is determined to be S1VR in step S108, the process proceeds to step S110 and the VR drive is immediately started in step S112. More specifically, CPU 38 obtains the amount of vibration of camera 11 based on an output from pitch sensor 6 and yaw sensor 40. CPU 38 subsequently obtains an amount of movement of the image of the photographic subject on image forming plane 12 based on the amount of vibration of camera 11. CPU 38 then outputs a control signal to drive circuit 44, based on the amount of movement of the image, that shifts or tilts VR lens L3 in order to compensate for an offset corresponding to the movement of the subject image.

Subsequently, CPU 24 of camera body 1 starts the AF drive in step S114. More specifically, CPU 24 outputs an appropriate control signal to drive circuit 30, based on the output from AF sensor 3, to drive DC motor 4. The rotational force of DC motor 4 is transferred to the drive mechanism of focusing lens group L2 through coupling 5, and moves focusing lens L2 to a proper location for setting the position. The rotation of DC motor 4 is detected by encoder 28 and output to CPU 24 as information that is subsequently used to control DC motor 4.

Moreover, in step S116, CPU 24 calculates and determines a time value, or "Tv value" that represents the shutter speed and an aperture value, or "Av value", based on the output of AE sensor 26. Both the Tv value and the Av value are displayed in a display portion (not shown) of camera body 1. The processes corresponding to steps S112 through S116 are performed continuously as long as a determination is made in step S118 that switch S1 is turned ON and a determination is made in step S120 that switch S2 is not turned ON.

Subsequently, when it is determined in step S120 that switch S2 is turned ON, CPU 24 stops the operation of AF drive in step S122 and immediately raises reflective mirror 10 or moves reflective mirror 10 to a pentagonal prism side (not shown) in step S124. As illustrated in FIG. 4, CPU 38 momentarily stops the VR drive operation in step S126, to center VR lens group L3 at a specified location. Upon completing the centering procedure of step S126, the VR drive is immediately resumed in step S128.

In step S130, CPU 38 then calculates the photographic magnification level according to Equation (1) below, based on the focal length information obtained from focal length information output unit 36 and information regarding the object distance obtained from absolute distance encoder 42.

Photographic magnification level=focal length/(object distance−focal length) Equation (1)

The result of the calculation of Equation (1) is compared to a specified value in step S132, and if the photographic magnification level is greater than the specified value, the AF drive is initiated in step S134, based on the output of displacement sensor 8. More specifically, CPU 38 determines the change in the image forming position of the photographic image due to the displacement of camera 11 along optical axis A based on the output of displacement sensor 8. CPU 38 then determines a distance that focusing lens group L2 must be driven to compensate for the change in the image forming position of the photographic image in order to move the image forming position to the original position. Based upon this determination, focusing lens group L2 is then correspondingly driven along optical axis A. CPU 38 then sets the position of focusing lens group L2 at the specified position using the output signal from absolute distance encoder 42 as a feed back control signal.

On the other hand, if the photographic magnification level is less than the specified value in step S132, the process corresponding to step S134 is not performed and the process proceeds to step S136. The specified value addressed at step S132 refers to the value stored in a memory that is controlled by CPU 38, which may be externally set by the photographer as necessary. For example, this value is set at $1/20$ if the photographer wishes to initiate the AF drive addressed in step S134 when the photographic magnification level is greater than $1/20$.

Whether step S134 is to be executed is determined based on the photographic magnification level as noted above because there is a close relationship between the photographic magnification level and the depth of field. More specifically, when the object distance is long, or when the photographic magnification level is small, as when a wide angle lens is used, the depth of field is greater and the focal slippage caused by the shifting of the focal plane remains lower than the visual resolution of the photographer's eyes, even if the camera and the lens move slightly along optical axis A. On the other hand, when photographs are taken at a closer range, or when the photographic magnification level is greater since the photographs are taken using a long focus lens, as in close-up photography, a shift of the focal plane due to the movement of the camera 11 along optical axis A becomes greater, often resulting in an out-of-focus image. In other words, when the photographic magnification level is great, even if the photographic operation is carried out after the in-focus state is achieved through the auto-focusing function, the photographs may nonetheless be out-of-focus as a result of a slight displacement of camera 11 along optical axis A during the exposure operation.

Figure 5:
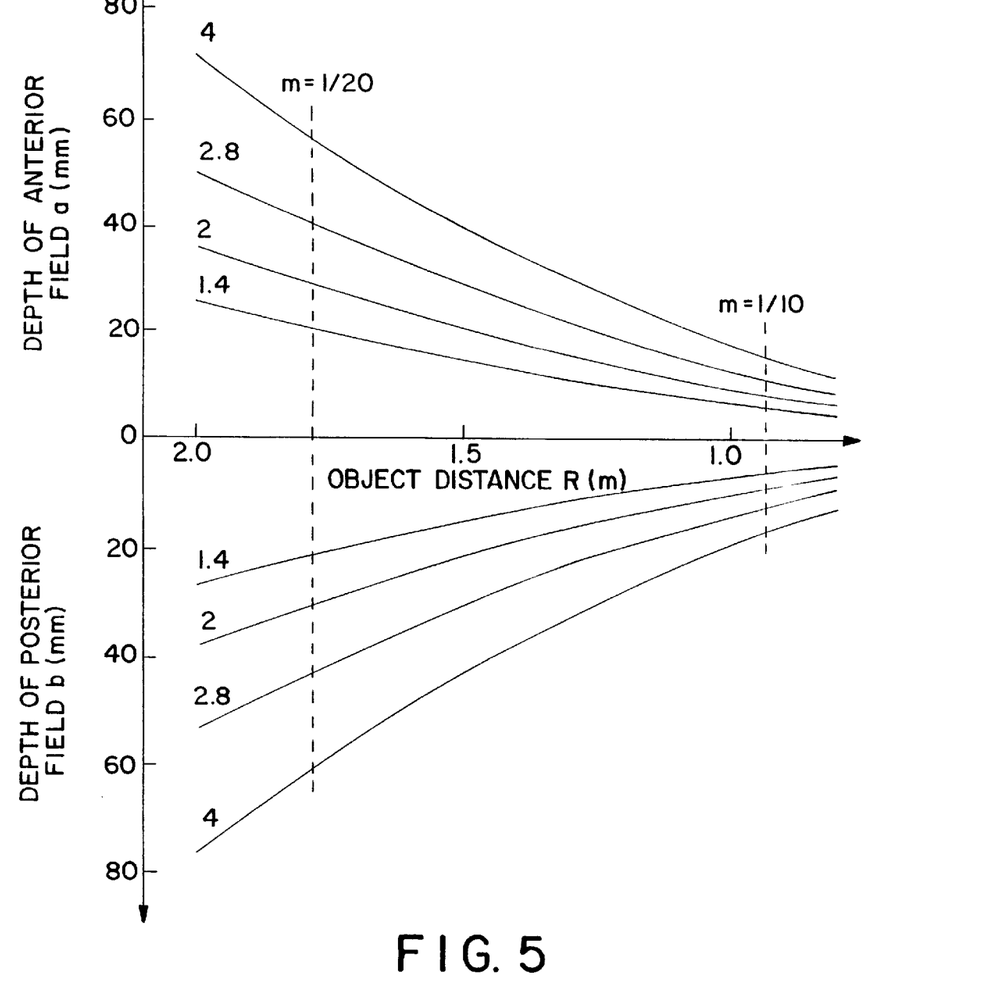
FIG. 5 is a graphical representation of the relationship between a photographic magnification level and depth of field.

FIG. 5 is a relationship between the photographic magnification level and the depth of field when a permissible circle of least confusion d is equal to $1/30$ mm for a lens that has a focal length of 85 mm and an open F value of 1:1.4. The axis of the ordinate and axis of abscissas of FIG. 5 indicate the depth of field and the object distance, respectively. Numbers shown at the left side of each of the curves indicate an aperture value, and dotted lines correspond to a photographic magnification level of $1/20$ or $1/10$, as indicated.

As illustrated in FIG. 5, when the photographic magnification level m is equal to $1/20$, object distance R is equal to 1.785 m, and aperture value F is equal to 2, the depth of field is approximately 30 mm in both the anterior and posterior of the focal plane of the subject. As illustrated in FIG. 5, it is slightly more difficult to maintain the image forming plane within the depth of field during the exposure operation when the photographs are taken by a camera held by hand. On the other hand, if the photographic magnification level is increased so that m is equal to $1/10$, object distance R is equal to 0.935 m and aperture value F is equal to 4, the depth of field narrows down to 20 mm in both the anterior and posterior of the focal plane of the subject, thereby resulting in an out-of-focus image being created by a slight camera shake.

Consequently, in a preferred embodiment of the present invention, the photographic magnification level is obtained using Equation (1) as described above, and the AF drive is executed to prevent out-of-focus images during the exposure operation, provided that the photographic magnification level is greater than the specified value. But, when the photographic magnification level is small, the AF drive is not executed to conserve electric power.

As illustrated in FIG. 4, following the processes of steps S132 and S134, the aperture is driven a specified amount, based on the Tv value and the Av value obtained in step S116. The exposure operation is then executed for a specified period of time in steps S136 and S138. Following the exposure operation, the driving procedure for VR lens group L3 is stopped in step S140, and VR lens group L3 is centered at a central position in step S142. The AF driving procedure for focusing lens group L2 is also stopped in step S144. When the AF driving procedure is stopped, a mirror down procedure in which mirror 10 is lowered to an original position is executed in step S146. Following the mirror down procedure, the status of switch S1 is verified in step S148. In step S146, if switch S1 is not turned ON, electrical power supply to each sensor is stopped, thereby ending a series of processes. On the other hand, if switch S1 is turned ON in step S146, the process returns to step S106.

As illustrated in FIG. 3, if, at step S108, the VR mode is determined to be S2VR, the process proceeds to step S152 to execute the required processes corresponding to steps S110 through S120 for the S1VR mode, excluding steps S110 and S112. More specifically, when switch S1 is turned ON, the AF driving operation of focusing lens group L2 is initiated in step S154 without initiating the VR driving operation. Subsequently, both the Tv value and the Av value are determined in step S156. The processes of steps S154 and S156 are continuously executed as long as switch S1 is turned ON at step S158 and switch S2 is not turned ON at step S160. When switch S2 is turned ON, step S122 and subsequent processes are executed.

As explained above, in this embodiment, the auto-focusing adjustment is performed using the output of AF sensor 3 as a reference during the preparation for photographic operation (prior to the exposure operation) in the same manner as with the prior art, but the reference is changed to the output of displacement sensor 8 during the exposure operation. As a result, sharper photographs with less blur are obtained by executing auto-focusing adjustment during the exposure operation and compensating for movement of the camera during the exposure operation, in addition to maintaining the in-focus state attained prior to the exposure operation.

A significant amount of electrical power is required from camera 11 when an auto-focus adjustment is executed. For this reason, in a preferred embodiment of the present invention, the auto-focus adjustment is executed using the output of displacement sensor 8 as a reference, only when the photographic magnification level is greater than the specified value. In other words, according to a preferred embodiment of the present invention, the auto-focus adjustment is executed during the exposure operation only under photographic conditions where the auto-focus adjustment has significant effect, so that unnecessary auto-focus adjustment is avoided to conserve electrical power of camera. As a result, the electric power supply of camera 11 is efficiently utilized.

In a preferred embodiment of the present invention, the auto-focus adjustment procedure is always executed using the output of either AF sensor 3 or displacement sensor 8 and is never executed using both outputs as a reference. This is done to avoid reduction in the processing speed of CPU 38 during the auto-focus adjustment procedure, since AF control would be complicated if the auto-focus adjustment were executed by concurrently taking the outputs from both sensors 3 and 8 into consideration.

In the description of the preferred embodiments of the present invention set forth above, the auto-focusing mode describe related to a single lens reflex auto-focus camera in which vibration compensation is achieved using a transistor-transistor logic ("TTL") phase difference detection method. However, the present invention is also applicable to a camera utilizing a continuous auto-focus mode in which the amount that focusing lens group L2 is driven during the exposure operation is obtained by adding the driving amount corresponding to the output of displacement sensor 8 and the driving amount estimated from the movement of the photographic subject.

In addition, the output signal used as the reference for auto-focus adjustment may be switched from the output of AF sensor 3 to the output of displacement sensor 8 when a valid signal is not obtained or when the signal would no longer be available from AF sensor 3 to execute the auto-focus adjustment operation. Therefore, in addition to switch S2 being turned ON, the reference output signal may be switched when mirrors 9 and 10 are raised, or when a valid output signal is no longer obtained from AF sensor 3, such as when photographic light does not reach AF sensor 3 as a result of the mirror-up operation. In this case, the auto-focus adjustment operation is executed based on the output of AF sensor 8 during the time period between switch S2 being turned ON and the mirror-up operation, thereby enabling a photographic operation that has a more accurate in-focus state.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An auto-focus camera that performs focusing adjustment of a focusing lens group to actualize an in-focus state, comprising:

an auto-focusing adjustment unit to move the focusing lens group along an optical axis based on a detection signal; and an in-focus state detection unit to detect the in-focus state and to output a corresponding output signal;

a displacement detection unit to detect displacement of the camera along the optical axis and to output a corresponding output signal, wherein the auto-focusing adjustment unit uses the output signal from the in-focus state detection unit as the detection signal and switches the detection signal from the output signal of the in-focus state detection unit to the output signal of the displacement detection unit.

2. An auto-focus camera according to claim 1, wherein the auto-focusing adjustment unit detects when the in-focus state detection unit is unable, or will be unable, to detect the in-focus state, and switches the detection signal to the output signal of the displacement detection unit.

3. An auto-focus camera according to claim 1, further comprising:

a first signal generation unit to output a first instruction signal to execute a photographic preparation operation; and a second signal generation unit to output a second instruction signal to execute a photographic operation after the first signal generation unit outputs the first instruction signal, wherein the focusing adjustment unit begins the focusing adjustment using the output signal from the in-focus state detection unit as the detection signal when the first signal generation unit outputs the first instruction signal, and switches the detection signal to the output signal of the displacement detection unit when the second signal generation unit outputs the second instruction signal.

4. An auto-focus camera according to claim 2, further comprising:

a first signal generation unit to output a first instruction signal to execute a photographic preparation operation; and a second signal generation unit to output a second instruction signal to execute a photographic operation after the first signal generation unit outputs the first instruction signal, wherein the focusing adjustment unit begins the focusing adjustment using the output signal from the in-focus state detection unit as the detection signal when the first signal generation unit outputs the first instruction signal, and switches the detection signal to the output signal of the displacement detection unit when the second signal generation unit outputs the second instruction signal.

5. An auto-focus camera according to claim 1, further comprising an optical path forming unit to form an optical path that connects a photographic subject and the in-focus state detection unit using light that passes through the camera while a photographic operation is not being carried out, wherein the auto-focusing adjustment unit switches the detection signal to the output signal of the displacement detection unit when the optical path forming unit no longer forms the optical path.

6. An auto-focus camera according to claim 2, further comprising an optical path forming unit to form an optical path that connects a photographic subject and the in-focus state detection unit using light that passes through the camera while a photographic operation is not being carried out, wherein the auto-focusing adjustment unit switches the detection signal to the output signal of the displacement detection unit when the optical path forming unit no longer forms the optical path.

7. An auto-focus camera according to claim 1, wherein the auto-focusing adjustment unit switches the detection signal to the output signal of the displacement detection unit when the in-focus state detection unit no longer outputs a valid output signal.

8. An auto-focus camera according to claim 2, wherein the auto-focusing adjustment unit switches the detection signal to the output signal of the displacement detection unit when the in-focus state detection unit no longer outputs a valid output signal.

9. An auto-focus camera according to claim 1, further comprising a photographic magnification calculation unit to obtain a photographic magnification level, wherein the focusing adjustment unit switches the detection signal to the output signal of the displacement detection unit if the photographic magnification level obtained by the photographic magnification calculation unit exceeds a specified value.

10. An auto-focus camera according to claim 1, further comprising a position detection unit to detect a position of the focusing lens group along the optical axis and to output a corresponding signal, wherein the auto-focusing adjustment unit determines the position of the focusing lens group from the output signal of the position detection unit, while using the output signal of the displacement detection unit as the detection signal.

11. An auto-focus camera according to claim 9, further comprising a position detection unit to detect a position of the focusing lens group along the optical axis and to output a corresponding signal, wherein the photographic magnification calculation unit obtains the magnification level based on the output of the position detection unit.

12. An auto-focus camera according to claim 1, further comprising:
- a camera shake detection unit to detect displacement along an image forming plane perpendicular to the optical axis;
- a camera shake compensation optical system to change the optical axis of the photographic optical system; and
- a camera shake compensation unit to compensate for camera shake in the plane direction of the image forming plane by driving the camera shake compensation optical system, wherein the camera shake compensation unit drives the camera shake compensation optical system based on the output signal of the camera shake detection unit while the auto-focusing adjustment unit is executing the focusing adjustment using the output signal of the displacement detection unit as the detection signal.

13. An auto-focus camera that performs focusing adjustment of a focusing lens group to actualize an in-focus state, comprising:
- an auto-focusing adjustment unit to move the focusing lens group along an optical axis based on a detection signal; and
- an in-focus state detection unit to detect the in-focus state and to output a corresponding output signal;
- a displacement detection unit to detect displacement of the camera along the optical axis and to output a corresponding output signal; and
- a position detection unit to detect a position of the focusing lens group along the optical axis and to output a corresponding signal, wherein the auto-focusing adjustment unit uses the output signal from the in-focus state detection unit as the detection signal and switches the detection signal to the output signal of the displacement detection unit, and wherein the auto-focusing adjustment unit determines the position of the focusing lens group from the output signal of the position detection unit, while using the output signal of the displacement detection unit as the detection signal.

14. An auto-focus camera according to claim 13, wherein the auto-focusing adjustment unit detects when the in-focus state detection unit is unable, or will be unable, to detect the in-focus state, and switches the detection signal to the output signal of the displacement detection unit.

15. An auto-focus camera according to claim 13, further comprising:
- a first signal generation unit to output a first instruction signal to execute a photographic preparation operation; and
- a second signal generation unit to output a second instruction signal to execute a photographic operation after the first signal generation unit outputs the first instruction signal, wherein the focusing adjustment unit begins the focusing adjustment using the output signal from the in-focus state detection unit as the detection signal when the first signal generation unit outputs the first instruction signal, and switches the detection signal to the output signal of the displacement detection unit when the second signal generation unit outputs the second instruction signal.

16. An auto-focus camera according to claim 14, further comprising:
- a first signal generation unit to output a first instruction signal to execute a photographic preparation operation; and
- a second signal generation unit to output a second instruction signal to execute a photographic operation after the first signal generation unit outputs the first instruction signal, wherein the focusing adjustment unit begins the focusing adjustment using the output signal from the in-focus state detection unit as the detection signal when the first signal generation unit outputs the first instruction signal, and switches the detection signal to the output signal of the displacement detection unit when the second signal generation unit outputs the second instruction signal.

17. An auto-focus camera according to claim 13, further comprising an optical path forming unit to form an optical path that connects a photographic subject and the in-focus state detection unit using light that passes through the camera while a photographic operation is not being carried out, wherein the auto-focusing adjustment unit switches the detection signal to the output signal of the displacement detection unit when the optical path forming unit no longer forms the optical path.

18. An auto-focus camera according to claim 14, further comprising an optical path forming unit to form an optical path that connects a photographic subject and the in-focus state detection unit using light that passes through the camera while a photographic operation is not being carried out, wherein the auto-focusing adjustment unit switches the detection signal to the output signal of the displacement detection unit when the optical path forming unit no longer forms the optical path.

19. An auto-focus camera according to claim 13, wherein the auto-focusing adjustment unit switches the detection signal to the output signal of the displacement detection unit when the in-focus state detection unit no longer outputs a valid output signal.

20. An auto-focus camera according to claim 14, wherein the auto-focusing adjustment unit switches the detection signal to the output signal of the displacement detection unit when the in-focus state detection unit no longer outputs a valid output signal.

21. An auto-focus camera according to claim 13, further comprising a photographic magnification calculation unit to obtain a photographic magnification level, wherein the focusing adjustment unit switches the detection signal to the output signal of the displacement detection unit if the photographic magnification level obtained by the photographic magnification calculation unit exceeds a specified value.

22. An auto-focus camera that performs focusing adjustment of a focusing lens group to actualize an in-focus state, comprising:
- an in-focus state detection unit to detect the in-focus state and to output a corresponding in-focus state signal;
- a displacement detection unit to detect displacement of the camera along the optical axis and to output a corresponding displacement signal;
- an auto-focusing adjustment unit to move the focusing lens group along an optical axis using the in-focus state signal or the displacement signal;

a first signal generation unit to output a first instruction signal to execute a photographic preparation operation;

a second signal generation unit to output a second instruction signal to execute a photographic operation after the first signal generation unit outputs the first instruction signal;

an optical path forming unit to form an optical path that connects a photographic subject and the in-focus state detection unit using light that passes through the camera while a photographic operation is not being carried out;

a photographic magnification calculation unit to obtain a photographic magnification level;

a position detection unit to detect a position of the focusing lens along the optical axis and to output a corresponding signal;

a camera shake detection unit to detect displacement along an image forming plane perpendicular to the optical axis;

a camera shake compensation optical system to change the optical axis of the photographic optical system; and a camera shake compensation unit to compensate for camera shake in the plane direction of the image forming plane by driving the camera shake compensation optical system.

23. An auto-focus camera that performs focusing adjustment of a focusing lens to actualize an in-focus state, comprising:

means for detecting the in-focus state and outputting a corresponding in-focus state output signal;

means for detecting displacement of the camera along the optical axis and outputting a corresponding displacement output signal; and means for moving the focusing lens along an optical axis based on a detection signal corresponding to the in-focus output signal, and switching the detection signal to correspond to the displacement output signal.

* * * * *